US011438232B2

(12) United States Patent
Gupta et al.

(10) Patent No.: US 11,438,232 B2
(45) Date of Patent: Sep. 6, 2022

(54) CONFIGURATION ITEM DETERMINATION BASED ON INFORMATION TECHNOLOGY DISCOVERY DATA ITEMS FROM MULTIPLE SOURCES

(71) Applicant: ServiceNow, Inc., Santa Clara, CA (US)

(72) Inventors: Manish Gupta, Redmond, WA (US); Navindra Sharma, Seattle, WA (US); Satish Babu Krishnamoorthy, Redmond, WA (US); Kiran Kumar Bushireddy, Woodinville, WA (US); Swapnesh Patel, Bothell, WA (US); Rukshan Felix Perera, Bothell, WA (US); Anand Karandikar, Bothell, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/935,103

(22) Filed: Jul. 21, 2020

(65) Prior Publication Data
US 2022/0029887 A1    Jan. 27, 2022

(51) Int. Cl.
H04L 41/085     (2022.01)
H04L 41/0853    (2022.01)
H04L 41/0893    (2022.01)

(52) U.S. Cl.
CPC ...... H04L 41/0856 (2013.01); H04L 41/0853 (2013.01); H04L 41/0893 (2013.01)

(58) Field of Classification Search
CPC ............ H04L 41/0853; H04L 41/0856; H04L 41/0893
See application file for complete search history.

(56) References Cited

U.S. PATENT DOCUMENTS

| | | | |
|---|---|---|---|
| 10,491,692 B1* | 11/2019 | Feiguine | G06F 9/5016 |
| 10,795,643 B2* | 10/2020 | Kumar | G06F 16/22 |
| 2006/0004875 A1* | 1/2006 | Baron | G06F 16/284 |
| 2009/0063562 A1* | 3/2009 | Dinger | G06F 16/25 |
| 2010/0082701 A1* | 4/2010 | Maheshwari | G06F 16/252 707/803 |
| 2010/0179945 A1* | 7/2010 | Rangarajan | G06F 16/2365 707/694 |
| 2016/0191623 A1* | 6/2016 | Vasudevan | H04L 29/06 709/201 |

(Continued)

OTHER PUBLICATIONS

Batty et al. "IT Service Management Best Practices Using IBM SmartCloud Control Desk". IBM RedBooks. Chapter 11, pp. 1-28. (Year: 2013).*

(Continued)

Primary Examiner — John M MacIlwinen
(74) Attorney, Agent, or Firm — Van Pelt, Yi & James LLP

(57) ABSTRACT

Information technology discovery data items are received from a plurality of different discovery sources. The received information technology discovery data items are stored in a multisource data store. The received information technology discovery data items from the plurality of different discovery sources are reconciled to determine an attribute value of a configuration item. The determined attribute value of the configuration item is stored in a configuration management database (CMDB).

20 Claims, 8 Drawing Sheets

(56) References Cited

U.S. PATENT DOCUMENTS

| | | | | |
|---|---|---|---|---|
| 2017/0308601 | A1* | 10/2017 | Massarenti | G06F 16/14 |
| 2018/0121486 | A1* | 5/2018 | Puvvada | G06F 21/62 |
| 2019/0129713 | A1* | 5/2019 | Tsugita | G06F 8/61 |
| 2019/0268244 | A1* | 8/2019 | Blakeman | G06F 3/0481 |
| 2020/0228408 | A1* | 7/2020 | Ben Ari | G06F 16/245 |

OTHER PUBLICATIONS

Patel, Monika; Patil, Smita; Tzanavara, Katerina; Chauhan, Manish; Wang, Yuhao; Xie, Houmin; and Shi, Lei, "Service Now: CMDB Research" May 2019. School of Professional Studies. 50. (Year: 2019).*

Sun, Bei-lei. English translation of CN 110955655 A. pp. 1-8. (Year: 2018).*

* cited by examiner

| Discovery Source | CI / Field | Value |
|---|---|---|
| A | XYZ / RAM | 4 GB |
| B | XYZ / RAM | 4.5 GB |
| C | XYZ / RAM | 5 GB |

520

| Discovery Source | Field | Priority |
|---|---|---|
| A | RAM | 1 |
| B | RAM | 2 |
| C | RAM | 3 |

524

Multisource Data Store 522

CMDB 526

| CI / Field | Value |
|---|---|
| XYZ / RAM | 4 GB |

FIG. 5B

CMDB 526

| CI / Field | Value |
|---|---|
| XYZ / RAM | 4.5 GB |

Multisource Data Store 522

| Discovery Source | CI / Field | Value |
|---|---|---|
| B | XYZ / RAM | 4.5 GB |
| C | XYZ / RAM | 5 GB |

528

| Discovery Source | Field | Priority |
|---|---|---|
| B | RAM | 2 |
| C | RAM | 3 |

FIG. 5C

CONFIGURATION ITEM DETERMINATION BASED ON INFORMATION TECHNOLOGY DISCOVERY DATA ITEMS FROM MULTIPLE SOURCES

BACKGROUND OF THE INVENTION

A configuration management database (CMDB) is an information technology infrastructure library (ITIL) database used by an organization to store information about hardware and software assets, which are often referred to as configuration items (CIs). A CI is a service component, infrastructure element, or other item that needs to be managed to ensure delivery of services. Examples of CI types include: hardware/devices, software/applications, communications/networks, and storage components. CIs in an environment are discovered by sensors and/or operational management products, which are referred to herein as information technology discovery sources, discovery sources, data sources, data discovery sources, sources, etc. In many scenarios, a CMDB interfaces with many discovery sources to discover CIs. Oftentimes, the various discovery sources do not coordinate with one another and the discovered attributes of CIs vary depending on the discovery source. Thus, techniques directed toward improved management and utilization of discovery sources would be beneficial.

BRIEF DESCRIPTION OF THE DRAWINGS

Various embodiments of the invention are disclosed in the following detailed description and the accompanying drawings.

FIGS. 5B and 5C are diagrams illustrating an example recompute of a configuration item value and the effects on stored data.

DETAILED DESCRIPTION

Figure 1:
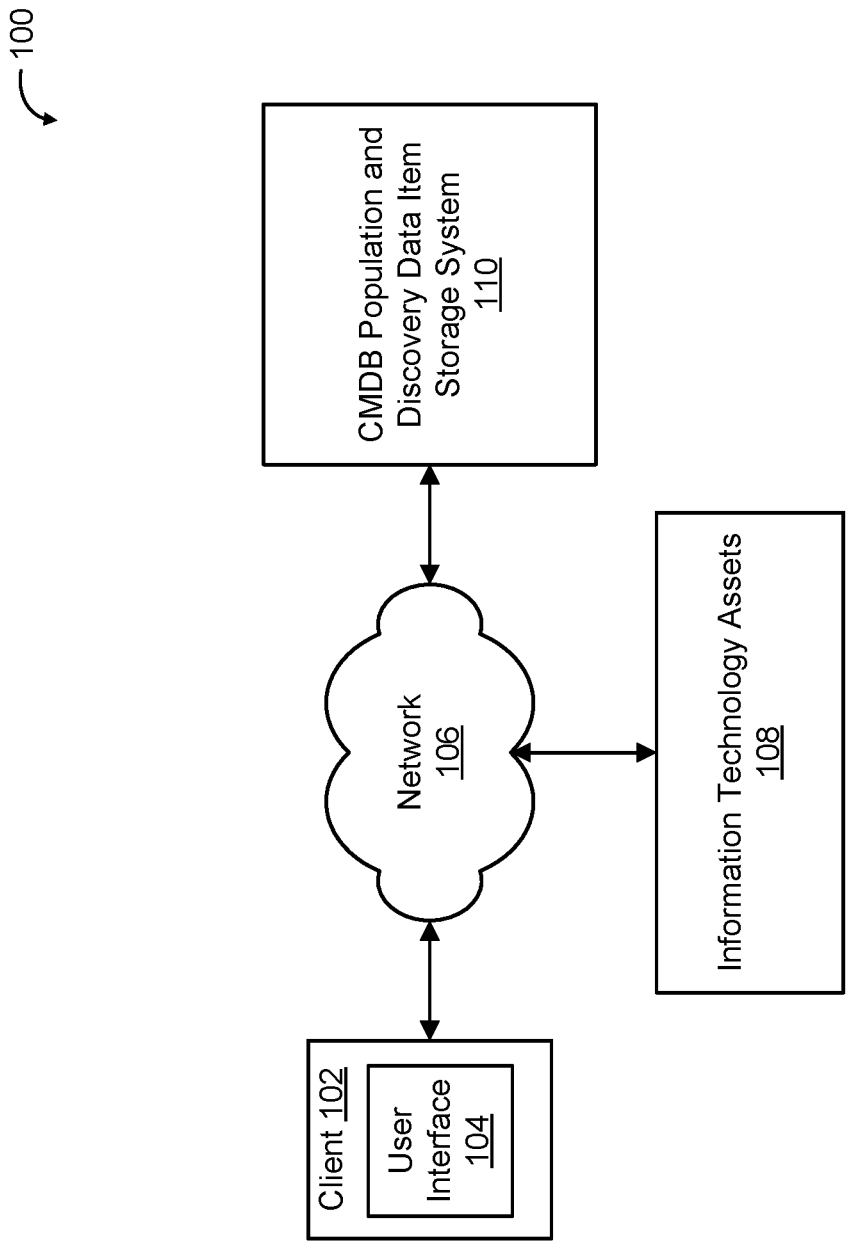
FIG. 1 is a block diagram illustrating an embodiment of a system for determining a configuration item based on stored information technology discovery data items from multiple sources.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Information technology (IT) discovery data items are received from a plurality of different discovery sources. The received information technology discovery data items are stored in a multisource data store. The received information technology discovery data items from the plurality of different discovery sources are reconciled to determine an attribute value of a configuration item. The determined attribute value of the configuration item is stored in a configuration management database (CMDB).

Technological benefits of the techniques disclosed herein include the ability to: 1) identify all data associated with CIs coming from various discovery sources at an attribute level, 2) gain operational insights from data from multiple discovery sources (referred to herein as multisource data) via performing analytics queries (e.g., to identify discrepancies among values reported by various discovery sources, determine a consensus reported value for a specific attribute, identify all records reported by a specific discovery source, etc., 3) utilize multisource data to create new or change existing reconciliation rules and thus prevent certain data discovery sources from corrupting a CMDB, 4) revert bad data from a specific discovery source, and 5) apply improved data reconciliation rules. Another advantage of collecting multisource data is the ability to use the collected data to train models (e.g., machine learning models) to automatically correct CMDBs (e.g., resolve discrepancies, remove corrupted data, etc.). Prior approaches have limitations because they do not store all the information reported for a CI from different discovery sources but rather only keep final values. Without storing all the information, context of how a record has been populated is lost, meaning there is no ability to resolve a conflict with respect to a specific value coming from different discovery sources, no ability to revert data from an incorrect discovery source, and no ability to obtain additional confidence in a value by corroborating it against multiple discovery sources. The techniques disclosed herein improve CMDB technology, including CMDB reliability and efficiency.

FIG. 1 is a block diagram illustrating an embodiment of a system for determining a configuration item based on stored information technology discovery data items from multiple sources. In the example shown, system 100 includes client 102, network 106, information technology assets 108, and CMDB population and discovery data item storage system 110. In various embodiments, client 102 is a computer or other hardware device that a user utilizes to perform information technology management tasks. Examples of client hardware devices include desktop computers, laptop computers, tablets, smartphones, and other devices. In the example illustrated, client 102 includes user interface 104. In various embodiments, user interface 104 is a software user interface through which the user manages CMDB population and discovery data item storage system 110. The software user interface may be a web portal, internal network portal, or other portal that allows users to transmit and receive data. Other examples of software include browsers, mobile apps, etc. User interface 104 may be used to analyze and manipulate multisource data collected from data discovery sources. For example, user interface 104 may be used to query multisource data stored in a multisource data store, configure/apply reconciliation rules associated with configuration items stored in a CMDB, trigger a recompute of discovered data items to modify an attribute of a configuration item stored in a CMDB, and generate reports associated with multisource data. User interface 104 may also be used to access tools that sort, filter, and present information associated with contents of a CMDB.

In the example illustrated, client 102 is communicatively connected to network 106. Requests may be transmitted to and responses received from server CMDB population and discovery data item storage system 110 using network 106. Examples of network 106 include one or more of the following: a direct or indirect physical communication connection, mobile communication network, Internet, intranet, Local Area Network, Wide Area Network, Storage Area Network, and any other form of connecting two or more systems, components, or storage devices together. In the example illustrated, client 102 and CMDB population and discovery data item storage system 110 are also communicatively connected to information technology assets 108 via network 106. In various embodiments, information technology assets 108 is a collection of computer or other hardware components along with associated software applications loaded onto the computer or other hardware components. Information technology assets 108 can also include communications/networks and storage hardware and software components. In various embodiments, information technology assets 108 is a collection of components distributed across a plurality of servers. Information technology assets 108 is a collection of assets comprising an information technology environment of a user on which the user performs discovery by utilizing CMDB population and discovery data item storage system 110.

In various embodiments, CMDB population and discovery data item storage system 110 includes one or more CMDBs and associated components configured to discover CIs associated with information technology assets 108 and populate those CIs in the one or more CMDBs. In various embodiments, CMDB population and discovery data item storage system 110 includes an identification and reconciliation engine that determines which data items collected from a plurality of information technology discovery sources are stored in the one or more CMDBs. In various embodiments, CMDB population and discovery data item storage system 110 also includes a multisource engine and associated multisource data store configured to process, store, and analyze the data items collected from the plurality of information technology discovery sources and reconcile them with CI information stored in the one or more CMDBs. An example of a CMDB population and discovery data item storage system is described in further detail below (e.g., see FIG. 2).

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional clients may exist. The number of components and the connections shown in FIG. 1 are merely illustrative. Components not shown in FIG. 1 may also exist.

Figure 2:
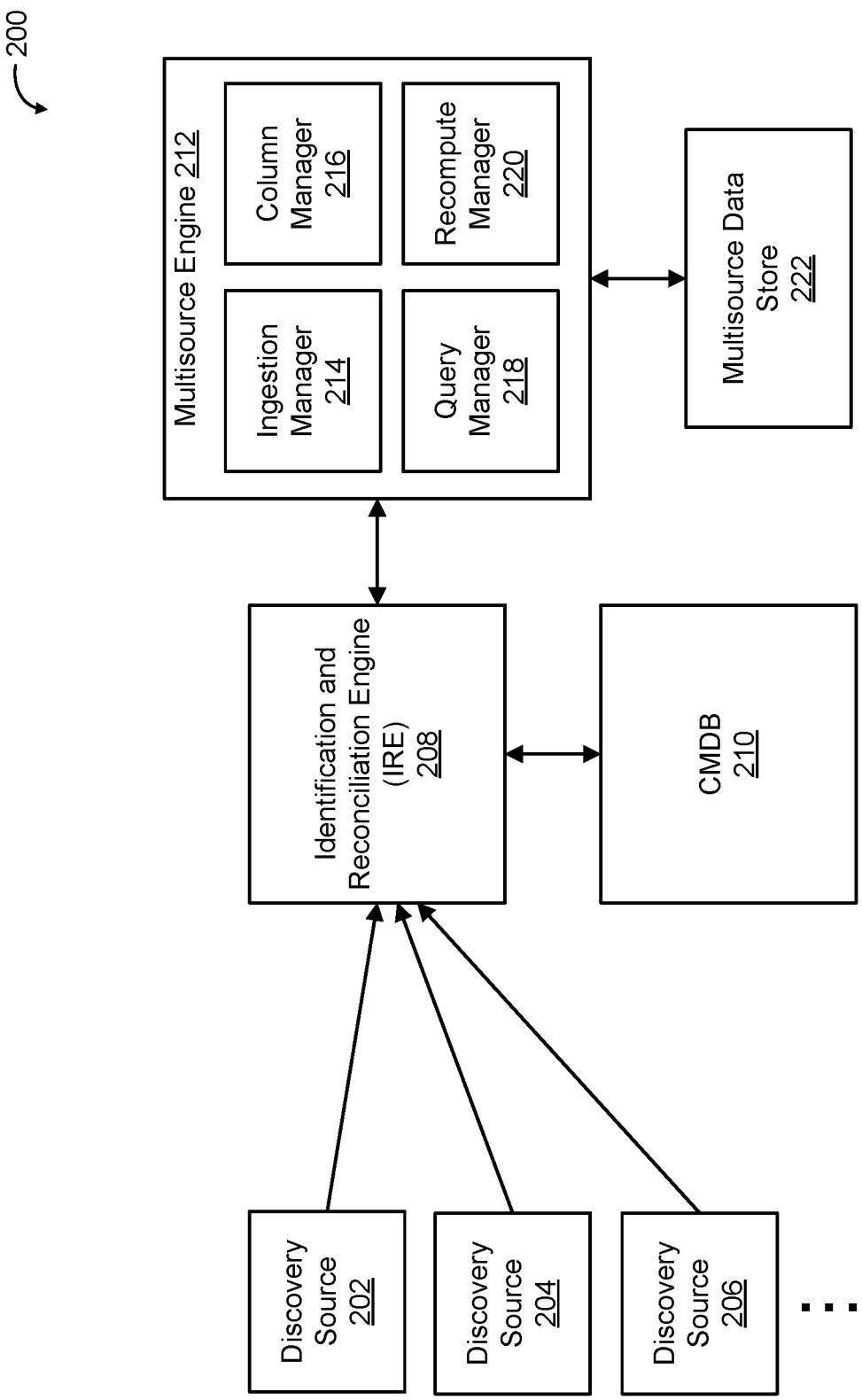
FIG. 2 is a block diagram illustrating an embodiment of a system for populating a CMDB and storing discovery data items.

FIG. 2 is a block diagram illustrating an embodiment of a system for populating a CMDB and storing discovery data items. In some embodiments, system 200 is CMDB population and discovery data item storage system 110 of FIG. 1. In the example illustrated, system 200 includes discovery sources 202, 204, and 206, identification and reconciliation engine (IRE) 208, CMDB 210, multisource engine 212, and multisource data store 222.

In various embodiments, discovery sources 202, 204, and 206 are software components that are able to detect hardware, software, and other assets in an information technology environment. Stated alternatively, discovery sources 202, 204, and 206 report on CIs (e.g., hardware/devices, software/applications, communications/networks, storage, etc.) that are managed in the information technology environment. In some embodiments, discovery sources 202, 204, and 206 report on information technology assets 108 of FIG. 1. Discovery sources 202, 204, and 206 may be distributed across various computers or other hardware components of a network. The example shown is illustrative and not restrictive. It is possible for system 200 to include more or fewer discovery sources.

In the example illustrated, identification and reconciliation engine 208 receives information technology discovery data items from discovery sources 202, 204, and 206. In various embodiments, the information technology discovery data items comprise CI information. In various embodiments, identification and reconciliation engine 208 is a software component that acts as a gatekeeper for CMDB tables (e.g., CMDB 210) and receives payloads from multiple discovery sources to store CI information in one or more CMDB tables. The multiple discovery sources oftentimes overlap with respect to reported CIs and CI attributes. For example, a first discovery source may report a value associated with a CI attribute for a first time and IRE 208 allows the value to be stored in CMDB 210. A second discovery source may then report a different value for the same CI attribute. IRE 208 would then perform a gatekeeping role and determine whether the value reported by the second discovery source should overwrite the value stored in CMDB 210 (e.g., according to a reconciliation rule). In some embodiments, authorization to overwrite (the reconciliation rule) is based on priority of the discovery source (e.g., each discovery source may be assigned a priority score). The reconciliation rule may be that IRE 208 allows values reported by discovery sources with higher priority to overwrite values reported by discovery sources with lower priority. Reconciliation performed by IRE 208 can be regarded as the process of reconciling CI data by allowing only designated authoritative discovery sources to write to CMDB 210 at the CI attribute level. In various embodiments, CMDB 210 is updated in real-time by IRE 208 as CI records are being processed and IRE 208 only allows storage of single versions/copies of CI values.

In various embodiments, CMDB 210 is a structured set of data held in one or more computers and/or storage devices. Examples of storage devices include hard disk drives and solid-state drives. CMDB 210 stores information about an IT environment. In various embodiments, CMDB 210 stores lists of CIs and relationships among CIs. CMDB 210 allows for centralized management of data associated with a diverse set of IT components (e.g., devices) even if the IT components are widely distributed. CMDB 210 can assist with performing IT service management processes, e.g., incident management, change management, and problem management. In the example illustrated, CMDB 210 is a "Golden CMDB" because it stores final CI values. Golden refers to a designated "correct" status. Stated alternatively, CMDB 210 stores results outputted from IRE 208, but not intermediate data utilized by IRE 208 or alternative versions of data. The example shown is illustrative and not restrictive. It is possible for system 200 to include multiple CMDBs (e.g., if CI data cannot all fit in a single CMDB).

In the example illustrated, multisource engine 212 is communicatively connected to IRE 208 and includes ingestion manager 214, column manager 216, query manager 218, and recompute manager 220. In various embodiments, multisource engine 212 and its components are software configured to manage multisource data. In some embodiments, a user is able to activate or deactivate multisource engine 212 (e.g., using user interface 104 of FIG. 1). When activated, multisource engine 212 collects and stores data from multiple discovery sources. CMDB accuracy can be improved by querying the collected/stored multisource data to perform consistency checks and other analysis to validate and verify CMDB accuracy. Example analysis includes determining whether all discovery sources are reporting the same data, whether any part of the IT environment is not being discovered by all the discovery sources, etc. In the example illustrated, multisource data is stored in multisource data store 222. In various embodiments, multisource data store 222 is a structured set of data held in one or more computers and/or storage devices. Examples of storage devices include hard disk drives and solid-state drives. In various embodiments, multisource data store 222 stores lists of CIs from multiple discovery sources (e.g., discovery sources 202, 204, and 206). An example storage structure associated with multisource data store 222 is described in further detail below.

In various embodiments, data received by IRE 208 is transmitted to ingestion manager 214. In various embodiments, ingestion manager 214 receives CI information from IRE 208 and stores source-specific CI data in multisource data store 222 (e.g., in a multisource table in multisource data store 222). For example, if ingestion manger 214 receives CI information from two different discovery sources, two rows of multisource data for the same CI could be created in a multisource table of multisource data store 222. In some embodiments, for each CI, a system identification is stored. The system identification indicates where the CI is stored (e.g., a specific CMDB, such as CMDB 210). In some embodiments, a class name is stored. The class name is a generic category reported by a discovery source. For example, "Windows Server", "Linux Server", "Unix Server", etc. may be class names. Class names typically correspond to CMDB storage categories. Structuring storage in the multisource table in the same way as storage in the CMDB is structured allows for more efficient referencing between CMDB 210 and multisource data store 222. In various embodiments, the discovery source (e.g., discovery source 202, discovery source 204, discovery source 206, etc.) is stored. In some embodiments, a domain is stored. The domain can correspond to access associated with the CI (e.g., domains may be assigned according to user classification, access level, etc.). The above can be regarded as metadata categories that allow for efficient organization of multisource data.

Along with metadata, CI attribute values associated with each CI are stored. Examples of CI attributes include various hardware properties (e.g., processor speed, amounts of various types of random-access memory (RAM) and other memory, etc.), network addresses, various software properties (e.g., version), and other properties. Numerous attributes (e.g., hundreds) may be associated with each CI. In various embodiments, CI attribute names and values are stored in a concatenated format (e.g., a JavaScript Object Notation (JSON) blob). In some embodiments, the JSON blob format is a list of CI attribute name/value pairs separated by commas. An advantage of storing in such a format is efficiency and simplicity of storage, which reduces complexity associated with maintaining schema synchronization between CMDB and multisource storage. In some embodiments, ingestion manager 214 also stores a subset of this data in a predefined set of indexed columns. Typically, the data stored in the predefined columns are data that are anticipated to be queried more frequently. An advantage of storing data in predefined columns is faster querying compared with querying of the concatenated format (e.g., the JSON blob). Querying the JSON blob is time consuming, particularly when large amounts of data are involved. For example, querying the JSON blob requires inspecting the entire blob for a given value. A predefined set of indexed columns reduces query time for commonly searched for CI data items. Thus, for each CI, in various embodiments, in addition to storing the full CI attribute data associated with the CI, a subset is also stored in an indexed format (e.g., columns) that can be efficiently searched.

Figure 6:
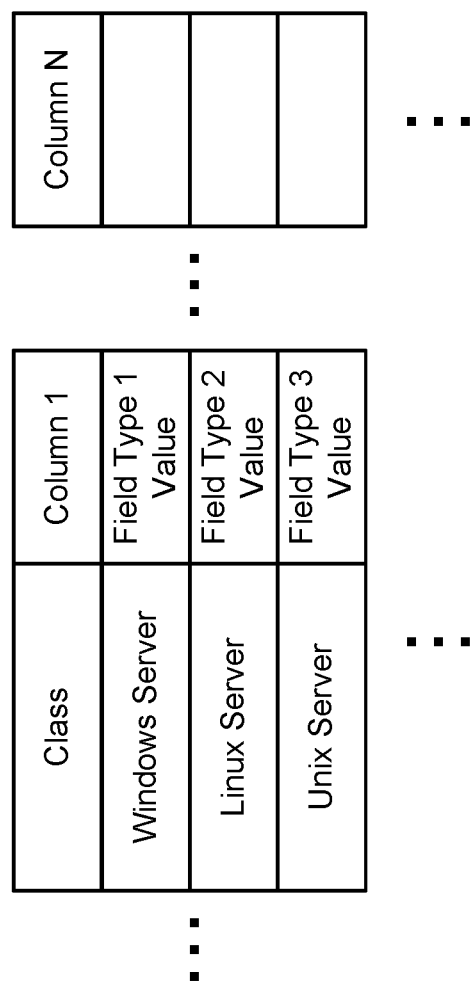
FIG. 6 is a diagram illustrating an example of floating columns.

In various embodiments, column manager 216 determines which CI data items are stored in the predefined set of indexed columns. In various embodiments, the columns are floating in the sense that they correspond to different CI attributes according to CMDB hierarchy. Floating columns allow for a relatively small number of columns to map to a relatively large number of field types. Stated alternatively, different CI attributes can be stored for different CIs. For example, different column mappings may be provided for different classes. If there are five classes, and each class has 100 fields (for a total of 500 field types), a data structure with only 100 columns would be needed to map all the field types. Stated alternatively, indexing a large number of fields with a relatively small number of columns can be accomplished by using generic columns that are mappable. As an example, column 1 for the "Windows Server" class can correspond to a first type of field, column 1 for the "Linux Server" class can correspond to a second type of field, and column 1 for the "Unix Server" class can correspond to a third type of field. FIG. 6 illustrates this example. In various embodiments, columns are configured to support multiple data types, e.g., string, integer, Boolean, floating point, etc.

Floating columns are a data structure for which interpretation of the fields can depend on the class being stored. In various embodiments, column manager 216 defines which fields (e.g., attributes) in each class map to which columns. In various embodiments, a multisource column metadata table is kept by column manager 216 to manage column mappings based on class. The class example given here is illustrative and not restrictive. It is also possible to map based on another property (e.g., domain) or map based on multiple properties. In some embodiments, various sets of CI attributes are arranged in separate tables. Column mapping of attributes may be performed based on table name. In some embodiments, column mappings can be inherited without needing to redefine mappings. For example, children CIs may inherit column mappings from parent CIs (e.g., a hardware device and its subcomponents may be considered parent and children CIs, respectively). In some embodiments, frequently used column mappings are pre-loaded into the multisource column metadata table (without requiring action by a user).

In various embodiments, query manager 218 allows a user to create and run queries against multisource data stored in multisource data store 222. In some embodiments, the user creates and runs the queries through user interface 104 of FIG. 1. Queries may be performed on data stored in a concatenated format (e.g., JSON blobs) and/or on data stored in floating columns. Various query types are possible. Many queries are difference queries, e.g., determining whether an attribute differs between two discovery sources (e.g., between discovery source 202 and discovery source 204) or between a discovery source and a CMDB (e.g., between discovery source 202 and CMDB 210). These difference queries are possible because CI data for all discovery sources (and not just final CMDB values) are stored in multisource data store 222. Queries may also be run to list specific CIs reported by specific discovery sources, verify that CIs are being discovered by specific discovery sources, list CIs reported by one discovery source but not another (e.g., to determine whether one discovery source is overlooking data during discovery and thus not functioning as expected), and find discrepancies with respect to a specific value (e.g., RAM of a specific computer). Thus, many queries can assist with identifying problems with specific discovery sources. Specific query examples are given below.

Queries that output CI records (queries that return a list of CIs, e.g., in a results table) include queries to: list all CIs reported by a specific discovery source, list all CIs that are reported by a first discovery source but not by a second discovery source, list CIs belonging to a specific class (e.g., computer class) in which a specific value (e.g., a RAM value) is different between a first discovery source and a second discovery source, find all Linux server CI records whose location is different than a reported value from a specific discovery source, and show all golden CIs populated by a specific discovery source with respect to a particular software service. In various embodiments, system identifications (indicating where the CIs are stored) are also reported (e.g., in the results table). Storage of system identifications in multisource data store 222 is described above.

Queries that output discovery sources (queries that return a list of discovery sources) include queries to: list discovery sources for a specific CI, find all discovery sources that populate a specific software service, list discovery sources for CIs of a specific class whose location value is a specific value, and find all discovery sources that populate RAM fields for specific hardware/software types. In various embodiments, for these outputs, a simple, read only list of discovery sources matching the query criteria is returned.

Queries that output multisource records include queries to: list all multisource software instance records reported by specific discovery sources, list all multisource computer hardware records reported by specific discovery sources and whose RAM value is a specific value, find all multisource CMDB records whose location value reported by a first discovery source and a second discovery source are different, and find all multisource Linux servers reported by specific discovery sources with a location field different from that in the golden CMDB. For these outputs, multiple entries for the same CI may be displayed because the same CI may be discovered by multiple sources. In various embodiments, these outputs include CIs and associated discovery sources in combination.

Additional queries may also be executed on results from a first query, thus allowing for additional filtering of query results. In some embodiments, query results are stored (e.g., in table form). Stored results may then be displayed to a user. In some embodiments, query results are reported and displayed to the user via user interface 104 of FIG. 1.

In various embodiments, recompute manager 220 allows a user to inspect and compare data in multisource data store 222 with data in CMDB 210. For example, after executing a query, the user may notice that a discovery source is populating CMDB 210 with improper data. The user may call upon recompute manager 220 to remove/revert the improper data. In some embodiments, the user interacts with recompute manager 220 through user interface 104 of FIG. 1. Example types of recomputes include: replacing values reported by a specific discovery source with values reported by another discovery source (e.g., a discovery source next in priority according to a reconciliation rule), re-apply an updated reconciliation rule without modifying multisource data, and recompute values associated with a specific class, derived (e.g., child) classes, and/or selected related data items. In some embodiments, a maximum number of CIs that are allowed to be recomputed is set. In some embodiments, recompute results are stored. Stored results may then be displayed to the user. In some embodiments, recompute results are reported and displayed to the user via user interface 104 of FIG. 1. Recomputing is described in further detail below (e.g., see FIGS. 5A-C).

In the example shown, portions of the communication path between the components are shown. Other communication paths may exist, and the example of FIG. 2 has been simplified to illustrate the example clearly. Although single instances of components have been shown to simplify the diagram, additional instances of any of the components shown in FIG. 2 may exist. For example, additional discovery sources, CMDBs, and/or multisource data stores may exist. The number of components and the connections shown in FIG. 2 are merely illustrative. The components shown in FIG. 2 are not necessarily located on the same server or in the same physical location. Components not shown in FIG. 2 may also exist.

Figure 3:
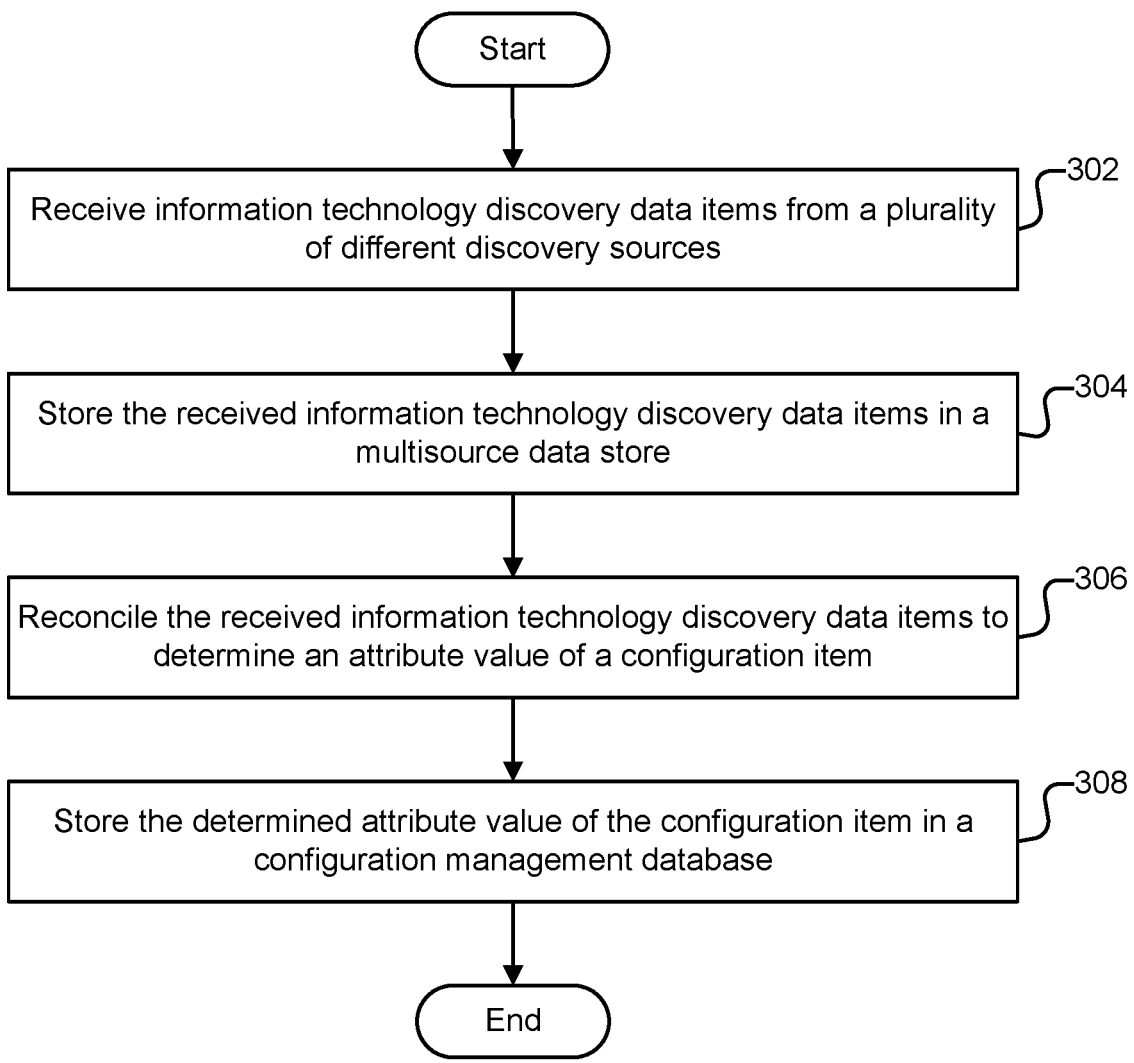
FIG. 3 is a flow diagram illustrating an embodiment of a process for determining a configuration item based on stored information technology discovery data items from multiple sources.

FIG. 3 is a flow diagram illustrating an embodiment of a process for determining a configuration item based on stored information technology discovery data items from multiple sources. In some embodiments, the process of FIG. 3 is performed by multisource engine 212 of FIG. 2.

At 302, information technology discovery data items are received from a plurality of different discovery sources. In some embodiments, the plurality of different discovery sources includes discovery sources 202, 204, and 206 of FIG. 2. The different discovery sources report on CIs in an IT environment. In some embodiments, the received information technology discovery data items include CI attribute data (e.g., names and values). CI attribute data is associated with properties of CIs. For example, if the CI is a device (e.g., a computer), then an attribute of the CI may be a hardware property (e.g., amount of RAM) of the device. Oftentimes, the same CIs are reported by multiple discovery sources. Thus, for a particular piece of CI attribute data (e.g., a RAM value for a device), multiple (perhaps inconsistent)

values may exist because the particular attribute has been reported by multiple discovery sources. In some embodiments, the information technology discovery data items are first received by IRE 208 of FIG. 2, which then transmits the information technology discovery data items to multisource engine 212 of FIG. 2 if multisource engine 212 is activated. In various embodiments, metadata associated with CIs are also received by multisource engine 212 of FIG. 2.

At 304, the received information technology discovery data items are stored in a multisource data store. In some embodiments, the multisource data store is multisource data store 222 of FIG. 2. Multiple (perhaps inconsistent) values for a CI attribute may be stored. For example, three different RAM values for a hardware device CI as reported by three different discovery sources may be stored in the multisource data store. In some embodiments, for each CI, attributes are stored in a JSON blob format (or another similar format) and a frequently queried (or anticipated to be frequently queried) subset of the attributes are stored in a smaller, readily searchable table (e.g., with the frequently queried attributes corresponding to columns of the table). In various embodiments, along with the stored CI attribute data, associated metadata are also stored (e.g., to allow for querying of the CI attributes) in the multisource data store. Examples of metadata associated with each CI include: the discovery source reporting on the CI, a system identification indicating where the CI information is stored (e.g., a specific CMDB, such as CMDB 210 of FIG. 2), and CI categorizations (e.g., a class name and domain) to allow for more efficient referencing and querying.

At 306, the received information technology discovery data items are reconciled to determine an attribute value of a configuration item. Stated alternatively, a CI value is reconciled based on multisource data. For example, three different RAM values for a hardware device CI may be reconciled to determine a final value to store in a golden CMDB. In some embodiments, a need to reconcile the information technology discovery data items to determine the attribute value of the CI is manifested after executing a query that uncovers a discrepancy associated with the attribute value. In some embodiments, determining the attribute value of the CI includes applying a reconciliation rule to multisource data. For example, to select a RAM value from among three different RAM values reported by three different discovery sources, the reconciliation rule may be to select the RAM value associated with the discovery source with the highest priority. As another example, the reconciliation rule may be to select the RAM value associated with a specific discovery source that the user believes to be the most reliable discovery source. In some scenarios, the reconciliation rule is a modified version of a reconciliation rule utilized by IRE 208 of FIG. 2. For example, after executing one or more multisource data queries, it may be determined that a particular discovery source is not functioning properly and is thus unreliable. The modified version of the reconciliation rule could be to apply the original reconciliation rule while excluding the unreliable discovery source.

At 308, the determined attribute value of the configuration item is stored in a configuration management database. In some embodiments, the CMDB is CMDB 210 of FIG. 2. The determined attribute value is stored in the CMDB to store a corrected version to replace a prior version. For example, a reconciled RAM value associated with a CI may be stored in the CMDB after obtaining an output of a reconciliation rule applied to multiple inconsistent RAM values from multiple discovery sources. Thus, a benefit of the techniques disclosed herein is the ability to revert an incorrect value in a golden CMDB to a correct value based on stored multisource data. Without the stored multisource data, there would be no correct version of the data to use for reversion.

Figure 4:
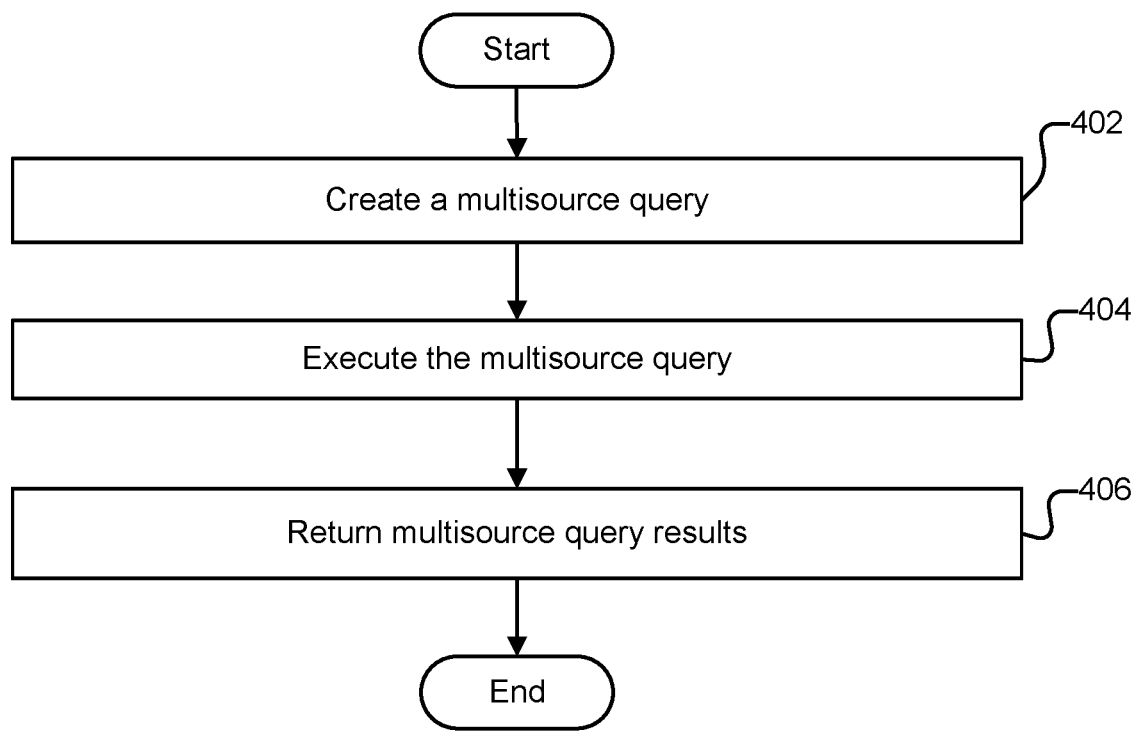
FIG. 4 is a flow diagram illustrating an embodiment of a process for querying multisource data.

FIG. 4 is a flow diagram illustrating an embodiment of a process for querying multisource data. In some embodiments, the process of FIG. 4 is performed by query manager 218 of FIG. 2. In some embodiments, at least a portion of the process of FIG. 4 is performed in 306 of FIG. 3.

At 402, a multisource query is created. In some embodiments, query manager 218 of FIG. 2 creates a query to be executed based on input provided by a user. In some embodiments, the user provides the input via user interface 104 of FIG. 1. Various query properties may be specified by the user, e.g., data to compare (e.g., which CIs, CI attributes, etc.), sources used for the comparison (e.g., which discovery sources, CMDBs, etc.), result type, and query constraints. Various query examples illustrating query properties are described above (e.g., see description associated with query manager 218 of FIG. 2). In many scenarios, the query involves comparing CI data across multiple discovery sources (e.g., to uncover discrepancies).

At 404, the multisource query is executed. In some embodiments, query manager 218 executes the query by accessing multisource data stored in multisource data store 222 of FIG. 2. In various embodiments, data is searched for in a table populated with frequently accessed (or anticipated to be frequently accessed) CI data. For example, the rows of the table could be CIs and the columns could be predefined and indexed CI attributes that are floating in the sense that the column labels are different for different classes of CIs. In some embodiments, the mappings between columns and CIs (to determine which CI attributes are stored in the table for which CIs) are managed by column manager 216 of FIG. 2. An advantage of utilizing a table with floating columns is that frequently queried data can be stored compactly and located quickly. Query time is reduced by searching a smaller data structure. For data not found in the table (e.g., infrequently accessed CI data), in various embodiments, a search of CI data stored in another data structure is performed. In various embodiments, all stored attribute data for each CI is stored in a format such as a JSON blob in multisource data store 222. Thus, a backup search may be performed on JSON blobs (or other similar data structures). In many scenarios, multiple values associated with the same CI attribute (e.g., inconsistent multiple values reported by multiple discovery sources) are located.

At 406, multisource query results are returned. In various embodiments, the query results are transmitted to the user. In some embodiments, the user is able to view the query results by utilizing user interface 104 of FIG. 1. The query results may be presented in a graphical format to the user through a graphical user interface of user interface 104 of FIG. 1. Oftentimes, the query results include data presented in a list format. Example results types include lists of CIs (e.g., CI record results), lists of discovery sources (e.g., discovery source results), and combined lists of CIs and discovery sources (e.g., multisource record results). In many scenarios, the user is presented with a discrepancy as to a CI value (e.g., a discrepancy resulting from inconsistent reporting across discovery sources) based on the query results.

Figure 5A:
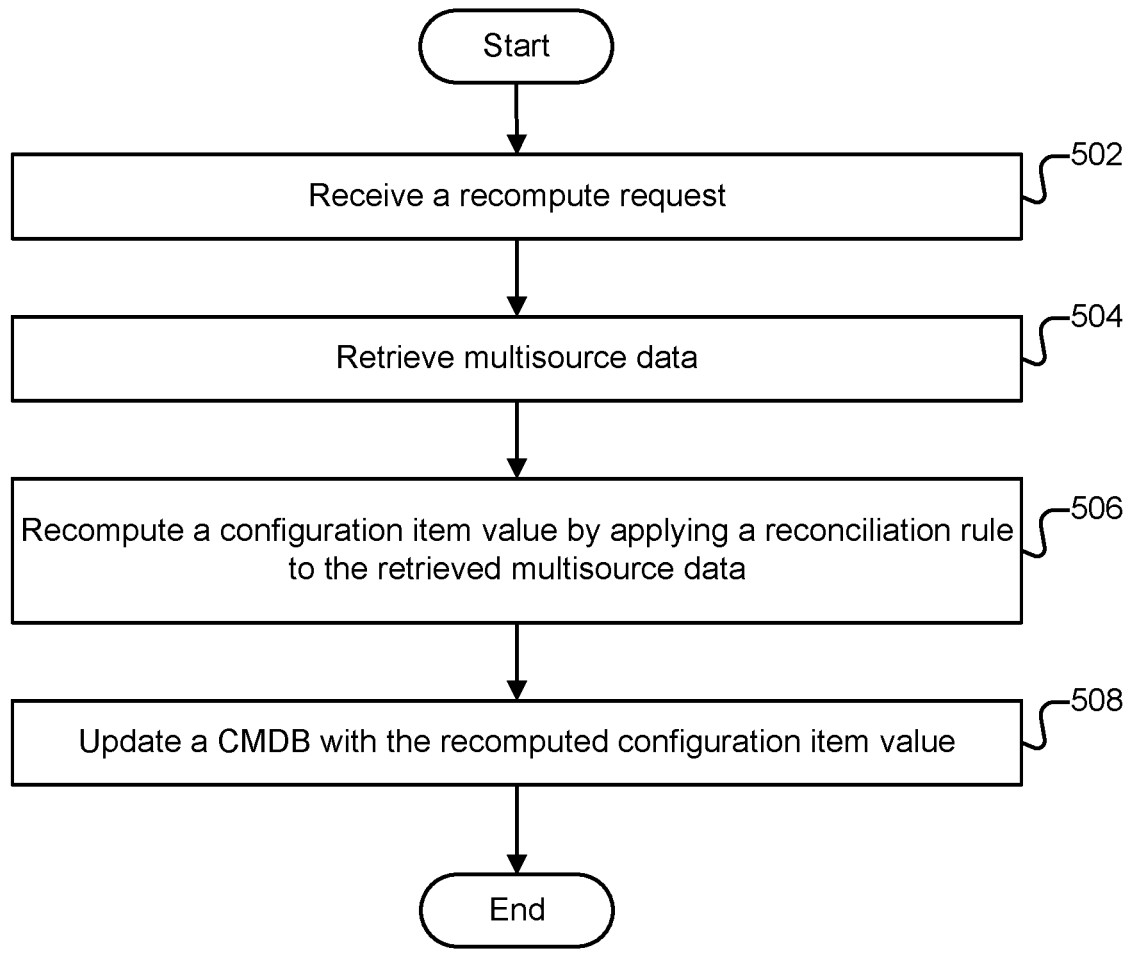
FIG. 5A is a flow diagram illustrating an embodiment of a process for recomputing a configuration item value based on multisource data.

FIG. 5A is a flow diagram illustrating an embodiment of a process for recomputing a configuration item value based on multisource data. In some embodiments, the process of FIG. 5A is performed by recompute manager 220 of FIG. 2.

In some embodiments, at least a portion of the process of FIG. 5A is performed in 306 of FIG. 3.

At 502, a recompute request is received. In some embodiments, the recompute request is transmitted by a user through user interface 104 of FIG. 1 and received by recompute manager 220 of FIG. 2. In various embodiments, the recompute request specifies the configuration items to be recomputed, the data upon which the recompute is based, and a reconciliation rule to utilize for the recompute. The reconciliation rule may be an updated version of a reconciliation rule utilized by IRE 208 of FIG. 2 to initially determine the configuration item value for storage in a golden CMDB (e.g., CMDB 210 of FIG. 2). By utilizing an updated reconciliation rule, the recompute request can result in an updated configuration item value to store in the golden CMDB. In some embodiments, an updated configuration item value can be obtained by utilizing the original reconciliation rule while altering which data the reconciliation rule uses to determine the configuration item value. This can be accomplished, for example, by excluding data associated with a specific discovery source when applying the reconciliation rule.

FIGS. 5B and 5C illustrate an example recompute (corresponding to the process of FIG. 5A) that involves excluding a discovery source and then applying a reconciliation rule. This example illustrates a recompute of a single value according to a single reconciliation rule. This example is illustrative and not restrictive. It is also possible for the user to specify recomputes associated with a plurality of CI attributes using multiple reconciliation rules. FIG. 5B shows data values before the recompute is performed. As shown in FIG. 5B, multisource data 520 includes data items from multiple discovery sources that are stored in multisource data store 522 when multisource data storage is activated. In some embodiments, multisource data store 522 is multisource data store 222 of FIG. 2. Multisource data 520 includes data from discovery sources A, B, and C. In some embodiments, discovery sources A, B, and C are discovery sources 202, 204, and 206 of FIG. 2. In the example shown, multisource data 520 includes three different values for the RAM field (attribute) of the CI "XYZ" as reported by the three different discovery sources.

As described with respect to IRE 208 of FIG. 2, only one of these values can be stored in the golden CMDB at any given time. In FIG. 5B, the golden CMDB is CMDB 526. In some embodiments, CMDB 526 is CMDB 210 of FIG. 2. In various embodiments, an IRE (e.g., IRE 208 of FIG. 2) stores data items (e.g., the values for XYZ/RAM) to CMDB 526 and overwrites them as needed as the data items are reported to the IRE and according to an applicable reconciliation rule. In the example shown, the reconciliation rule is represented graphically by table 524, which indicates that RAM values are stored/overwritten according to discovery source priority. Specifically, table 524 shows that with respect to RAM values, discovery source A has the highest priority, followed by discovery source B, and then followed by discovery source C. Thus, for example, if discovery sources C, B, and A reported to the IRE in that order, the value "5 GB" associated with discovery source C would be stored in CMDB 526, then it would be overwritten by the value "4.5 GB" associated with discovery source B, which would also then be overwritten by the value "4 GB" associated with discovery source A (as dictated by the priorities shown in table 524). Thus, after ingestion of data from the discovery sources, the RAM value for XYZ stored in CMDB 526 would be 4 GB. The graphical representations shown in FIGS. 5B and 5C are diagrammatic in nature. They have been simplified to illustrate the example clearly and are not intended to require a particular format for data storage in the golden CMDB and/or the multisource data store.

Returning to the process of FIG. 5A, at 504, multisource data is retrieved. In various embodiments, the multisource data is retrieved from a multisource data store (e.g., multisource data store 222 of FIG. 2). In many scenarios, the multisource data corresponds to multiple inconsistent values for a CI attribute and the purpose of the recompute request is to resolve the discrepancy in the multisource data and determine a correct value to store in the golden CMDB. In the example of FIG. 5B, the multisource data is multisource data 520. In some embodiments, recompute manager 220 is utilized to perform the recompute based on the received recompute request and the received multisource data.

At 506, a configuration item value is recomputed by applying a reconciliation rule to the retrieved multisource data. FIG. 5C continues the example shown in FIG. 5B. FIG. 5C shows changes to the data values of FIG. 5B after a recompute is performed. Specifically, FIG. 5C shows updated contents of multisource data store 522 and CMDB 526 after discovery source A shown in multisource data 520 is excluded from the reconciliation rule represented graphically by table 524. The exclusion of discovery source A (e.g., because it has been determined to be unreliable) is represented graphically by table 528 of FIG. 5C, which now only shows discovery source B and discovery source C and their priorities. Applying the same reconciliation rule described above while excluding discovery source A results in a different value determined for the RAM field of configuration item XYZ. The 5 GB value associated with discovery source A can no longer be stored because discovery source A has been excluded. Now, according to the priorities of discovery source B and discovery source C, the 4.5 GB value associated with discovery source B is the determined RAM value. In this example, the reconciliation rule did not change; rather, the discovery sources that the reconciliation rule operated on changed. It is also possible to recompute a configuration item value by keeping the discovery sources the same and changing the reconciliation rule. For example, the new reconciliation rule could be to use the RAM value reported by the discovery source that matches a specified criterion or use the RAM value reported by a specific discovery source. The priorities of the discovery sources could be changed. Other changes to the reconciliation rule could also be made that would result in determining a different value for the configuration item.

At 508, a CMDB is updated with the recomputed configuration item value. The recomputed configuration item value (if different from the original value) needs to be stored in the CMDB to reflect a completed recompute. In some embodiments, recompute results are stored in a format (e.g., a table) that can be reported to and displayed for the user (e.g., using user interface 104 of FIG. 1). In the example of FIGS. 5B and 5C, CMDB 526 is updated to store the value 4.5 GB for the RAM field of CI XYZ (value changed from 4 GB in FIG. 5B to 4.5 GB in FIG. 5C). In addition, because the recompute involved excluding discovery source A of multisource data 520, multisource data store 522 is updated in FIG. 5C to no longer store the corresponding discovery source A data items that are shown in FIG. 5B. If the recompute involved changing the reconciliation rule without excluding discovery sources, then the contents of multisource data store 522 would not need to be updated.

An advantage of the recompute mechanism described above is that the golden CMDB state can be re-calculated on demand using existing data available in multisource storage.

Discrepancies uncovered by the user (e.g., through queries) can be resolved quickly. For example, if an unreliable discovery source is uncovered, data reported by that unreliable discovery source and stored in the golden CMDB can be reverted. A less efficient alternative would be to wait for a next data import and discovery cycle (e.g., repeating discovery with the unreliable discovery source excluded), which would be time consuming and cause the golden CMDB state to be inconsistent.

FIGS. 5B and 5C are diagrams illustrating an example recompute of a configuration item value and the effects on stored data. FIGS. 5B and 5C are described with respect to FIG. 5A above.

FIG. 6 is a diagram illustrating an example of floating columns. FIG. 6 is described with respect to FIG. 2 above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving information technology discovery data items from a plurality of different discovery sources;
storing the received information technology discovery data items in a multisource data store associated with a configuration management database, wherein:
the multisource data store is a storage that is separate from the configuration management database;
the multisource data store includes a multi-dimensional data structure configured to index different configuration items using a first dimension of the multi-dimensional data structure and index different configuration item attributes using a second dimension of the multi-dimensional data structure, wherein a segment of the multi-dimensional data structure, spanning multiple indices along the first dimension and having a common index along the second dimension, is configured to store different types of attributes of the different configuration item attributes; and
the multisource data store further includes a second data structure configured to store, in a concatenated list format, the different types of attributes of the different configuration item attributes;
reconciling the received information technology discovery data items from the plurality of different discovery sources to determine an attribute value of a configuration item from among a plurality of candidate attribute values, stored in the multisource data store, corresponding to the plurality of different discovery sources; and
storing the determined attribute value of the configuration item in the configuration management database.

2. The method of claim 1, wherein the received information technology discovery data items include inconsistent values associated with an information technology asset.

3. The method of claim 1, wherein the different discovery sources are configured to report information associated with a distributed collection of information technology assets.

4. The method of claim 3, wherein the distributed collection of information technology assets includes one or more of the following: a hardware device, a software application, a network, or a storage component.

5. The method of claim 3, wherein the distributed collection of information technology assets is communicatively connected to the multisource data store and the configuration management database via a network.

6. The method of claim 1, wherein storing the received information technology discovery data items in the multisource data store includes storing each of the received information technology discovery data items in a corresponding data structure comprising a list of configuration item attribute-value pairs.

7. The method of claim 6, wherein the data structure comprising the list of configuration item attribute-pairs is in a JavaScript Object Notation format.

8. The method of claim 1, wherein storing the received information technology discovery data items in the multisource data store includes storing the received information technology discovery data items in a table of frequently accessed data items.

9. The method of claim 8, wherein the table of frequently accessed data items comprises columns mapped to configuration item attributes.

10. The method of claim 1, wherein reconciling the received information technology discovery data items from the plurality of different discovery sources to determine the attribute value of the configuration item includes selecting a data item from the received information technology discovery data items according to a reconciliation rule.

11. The method of claim 10, wherein the reconciliation rule is associated with selecting a discovery source to provide the data item based at least in part on a priority score of the discovery source.

12. The method of claim 1, wherein reconciling the received information technology discovery data items from the plurality of different discovery sources to determine the attribute value of the configuration item includes excluding one or more data items associated with a specified discovery source.

13. The method of claim 1, wherein storing the determined attribute value of the configuration item in the configuration management database includes overwriting a prior corresponding value in the configuration management database that has been determined to be an incorrect value.

14. The method of claim 1, further comprising querying the multisource data store to determine a discrepancy among the received information technology discovery data items.

15. The method of claim 14, wherein querying the multisource data store includes searching for a data item in a table of frequently accessed data items and searching for the data item in another data structure in response to a determination that the data item is not located in the table of frequently accessed data items.

16. The method of claim 1, further comprising storing metadata associated with the received information technology discovery data items in the multisource data store.

17. The method of claim 1, further comprising receiving a request from a user to recompute a configuration item attribute value.

18. The method of claim 1, wherein the received information technology discovery data items at least in part correspond to amounts of random-access memory associated with the configuration item.

19. A system, comprising:
one or more processors configured to:
receive information technology discovery data items from a plurality of different discovery sources;
store the received information technology discovery data items in a multisource data store associated with a configuration management database, wherein:

the multisource data store is a storage that is separate from the configuration management database;

the multisource data store includes a multi-dimensional data structure configured to index different configuration items using a first dimension of the multi-dimensional data structure and index different configuration item attributes using a second dimension of the multi-dimensional data structure, wherein a segment of the multi-dimensional data structure, spanning multiple indices along the first dimension and having a common index along the second dimension, is configured to store different types of attributes of the different configuration item attributes; and the multisource data store further includes a second data structure configured to store, in a concatenated list format, the different types of attributes of the different configuration item attributes;

reconcile the received information technology discovery data items from the plurality of different discovery sources to determine an attribute value of a configuration item from among a plurality of candidate attribute values, stored in the multisource data store, corresponding to the plurality of different discovery sources; and store the determined attribute value of the configuration item in the configuration management database; and a memory coupled to at least one of the one or more processors and configured to provide at least one of the one or more processors with instructions.

20. A computer program product embodied in a non-transitory computer readable medium and comprising computer instructions for:

receiving information technology discovery data items from a plurality of different discovery sources;

storing the received information technology discovery data items in a multisource data store associated with a configuration management database, wherein:

the multisource data store is a storage that is separate from the configuration management database;

the multisource data store includes a multi-dimensional data structure configured to index different configuration items using a first dimension of the multi-dimensional data structure and index different configuration item attributes using a second dimension of the multi-dimensional data structure, wherein a segment of the multi-dimensional data structure, spanning multiple indices along the first dimension and having a common index along the second dimension, is configured to store different types of attributes of the different configuration item attributes; and the multisource data store further includes a second data structure configured to store, in a concatenated list format, the different types of attributes of the different configuration item attributes;

reconciling the received information technology discovery data items from the plurality of different discovery sources to determine an attribute value of a configuration item from among a plurality of candidate attribute values, stored in the multisource data store, corresponding to the plurality of different discovery sources; and storing the determined attribute value of the configuration item in the configuration management database.

* * * * *